(No Model.)

C. H. GUESS.
CORN EXTRACTOR.

No. 466,097.   Patented Dec. 29, 1891.

Witnesses.
J. M. Caldwell.
H. C. Ashbery.

Carl H. Guess. Inventor.
By James Sangster, Attorney.

UNITED STATES PATENT OFFICE.

CARL H. GUESS, OF BUFFALO, NEW YORK, ASSIGNOR TO DANIEL J. WHITE AND JAMES J. KENNY, BOTH OF SAME PLACE.

CORN-EXTRACTOR.

SPECIFICATION forming part of Letters Patent No. 466,097, dated December 29, 1891.

Application filed October 31, 1891. Serial No. 410,416. (No model.)

*To all whom it may concern:*

Be it known that I, CARL H. GUESS, a citizen of the United States, residing in Buffalo, in the county of Erie and State of New York, have invented certain new and useful Improvements in Corn-Extractors, of which the following is a specification.

My invention consists in a new and improved device for extracting corns, and will be fully and clearly hereinafter described and claimed, reference being had to the accompanying drawings, in which—

Figure 1:
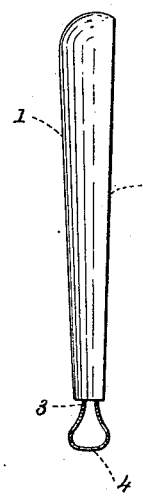
Figure 3:
Figure 4:
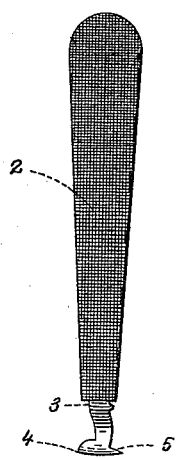
Figure 2:
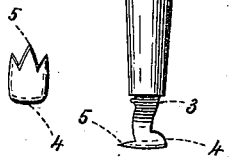

Figure 1 is a front elevation of the combined cutting and scraping device, showing a side elevation of the handle. Fig. 2 is a detached top view of the combined cutting and scraping device. Fig. 3 is a side elevation of the cutting and scraping device, showing also the round or convex side of the handle. Fig. 4 is a similar view of the cutting and scraping device, showing also the rough or emery face of the handle.

Referring to the drawings, 1 represents the round or convex side of the handle. It is preferably made of wood, but may be made of any other suitable material. One side 2 of this handle is made flat and is covered with emery, pulverized quartz, or other suitable material that presents a good cutting-surface. The object of this roughened side of the handle is to provide a convenient means in the same instrument for smoothing over the rough places after the corn has been extracted.

The combined cutter and scraper is formed of tempered steel in a loop shape and secured to the handle by driving the shank 3 into it, substantially as shown. The front edge 4 is slightly curved, substantially as shown, and made very sharp. At the rear is a sharp-pointed picker 5. The edges, it will be seen, incline slightly from the bottom upward, so as not to be inclined to dig down into the foot or toe while being used. Its object is to provide the means for picking up or starting the corn, and the object of the curved cutting-edge 4 is to assist in extracting the corn and trimming off the rougher portions, after which the emery-covered portion of the handle is used to smooth the portions left after taking the corn out or trimming it down.

I claim as my invention—

A corn-extractor consisting of a loop-shaped steel cutter 4, having a pointed picker 5 at the rear of the cutter, the whole formed in one piece and secured to a handle, substantially as described.

CARL H. GUESS.

Witnesses:
JAMES SANGSTER,
J. M. CALDWELL.